Patented Oct. 30, 1951

2,572,906

UNITED STATES PATENT OFFICE 2,572,906

IMPREGNATING COMPOSITIONS FOR INSULATING MATERIALS

Robert E. Berringer, Bloomfield, N. J., assignor, by mesne assignments, to Union Carbide and Carbon Corporation, a corporation of New York No Drawing. Application June 8, 1945, Serial No. 598,413

20 Claims. (Cl. 174—120)

This invention relates to impregnating compositions or saturants intended to serve as binders for insulation (asbestos, cotton, glass fibers, etc.) about electrical conductors, and particularly for insulation that may be subject to overheating, such as asbestos-insulated lead-in wires for waffle-irons, hair-waving units and the like. Ordinarily, the insulation is bonded by means of organic compounds that when overheated give off dense fumes or smoke and become valueless as binders for maintaining the insulation about the conductors; a definite fire hazard is thereby created.

According to the present invention saturants for bonding lead-in wire insulation and the like are provided that upon overheating create a substitute or permanent binder to maintain the insulation about the conductors and so eliminate any fire hazard; the preferred compositions are furthermore characterized by the absence of fumes or smoke upon the forming of the binder by a heating action. While a loss in flexibility occurs, the loss is of no moment, since the liberation of the permanent binder takes place after the lead-in wires have been installed.

The invention makes use of the known fact that alcohol esters of silicic acid will upon hydrolysis liberate an adhesive silica. The principle is made effective for the purposes of the invention by the discovery that the hydrolysis can be made to occur by incorporating in an anhydrous solution of such an ester a soluble agent that releases water upon heating; in the absence of heating the agent is preferably one that remains latent and causes no hydrolysis or gel formation. Anhydrous organic solvents preferred are those that volatilize at temperatures below the decomposition point of the hydrolyzing agent so that the solvent content can be evaporated following impregnation without hydrolysis of the silicon ester; such solvents include acetone, isopropyl-ketone, methyl-ethyl-ketone, alcohols, etc. A clear, homogeneous low-viscosity solution of ester and hydrolyzing agent free from gel structure can thus be obtained for ready penetration of a porous article to which it may be applied.

The preferred alcohol esters for electrical insulation use are the alkyl or monohydric alcohol silicates ranging from the methyl to the amyl. But also useful are the condensed alcohol silicates, such as methyl and ethyl disilicates, etc. and the polyhydric alcohol silicates, such as the silicates of ethylene-glycol, glycerol, etc. It is possible likewise to use esters of other inorganic acids that yield gel-forming oxides upon hydrolysis, such as the alcohol esters of titanium and zirconium acids.

For releasing water for reaction with an ester, an agent found preeminently satisfactory in the case of electrical insulation is oxalic acid; this decomposes upon rapid heating into carbon monoxide, carbon dioxide and water, and is therefore free from fume or smoke formation. But generally water-releasing agents that are soluble in organic solvents for the ester selected are useful as, for instance, other decomposable organic compounds and crystalline salts, such as boric acid and the metal borates that are further advantageous in imparting flame-resistance and particularly for applications where the electrical properties are not of primary importance.

The solution of ester and agent can be incorporated with any of the usual binders that are soluble in or miscible with the solution without interfering with the application of the binders to the insulation or with the subsequent installation of the insulated conductors. Preferably the compounds selected and included in the compositions to act as initial or temporary binders are those that upon application to the conductor insulation form a protective coating on the insulation and act as a water barrier, since hydrolysis of the alcohol esters occurs at normal temperature in proportion to the amount of water that may come in contact with the esters. Compounds serving as binders that are in addition soluble in organic solvents for the esters and hydrolyzing agents comprise ethyl cellulose, cellulose acetate, copolymer of vinyl acetate and vinyl chloride, etc.

As an illustration of the invention a composition for the bonding and impregnating of the asbestos insulation on lead-in wires was prepared according to the following formula (parts being by weight):

| | Parts |
|---|---|
| Vinyl copolymer (85% chloride) | 5.0 |
| Tetra-o-ethyl silicate | 8.0 |
| Oxalic acid | 4.1 |
| Dioctyl phthalate (plasticizer) | 1.0 |
| Acetone | 82.0 |

By mixing the other ingredients in the acetone, a clear solution of low viscosity and about 18% solids was obtained. The solution was placed in a bath through which the asbestos-covered wire was passed, and the so-impregnated wire was then led for about a minute through an oven heated to about 80° C. to eliminate the acetone. In the evaporation of the solvent, the vinyl copolymer was drawn to the surface of the insulation to form a smooth continuous coating thereon. The coating thus formed served to trap within the insulation the ethyl silicate (boiling point 165° C.) and the oxalic acid; and the coating, being water-resistant, also served to prevent access of water to the interior of the insulation. When the so-treated wire was heated to 100° C. decomposition of the oxalic acid began, thus releasing water that hydrolyzed the silicate to alcohol and silicic acid and the latter became dehydrated to form a network of adhesive silica gel extending throughout the insulation; since only carbon dioxide, water and alcohol were released, and the alcohol in but small proportion, there were no objectionable fumes or inflammable gases to create smoke. Also the proportion of the vinyl copolymer coating being small, there was no marked destructive action on the coating. The lead-in wires were accordingly not particularly harmed by the heating and their continued use was not impaired particularly as the silica gel set up as a permanent binder for the insulation.

The impregnating composition of the foregoing illustration was low in solids content, but any concentration up to 40 to 50% or more of solids can be prepared; it is, however, preferable to have the composition diluted or of low viscosity for applying, both for ease of impregnation and for distribution of the composition. Likewise there is no critical proportion of vinyl copolymer (or other film-forming compound) to the silicate and water-releasing agent. The oxalic acid was added in combining proportion for substantially complete hydrolysis, though this is not essential. The plasticizer was included to give toughness to the vinyl copolymer coating.

In addition to impregnating and bonding asbestos insulation, the composition has been applied to cotton (with marked improvement in fire-resistance) and to glass-covered wire conductors with good effect. For application to wood and similar porous bodies the bonding or protective coating material can be omitted, particularly when heat is applied, following the impregnation and the solvent removal, to cause liberation of water and consequent formation of the dispersed silica gel in the wood or other material. Alcohols and other organic common solvents for the esters and water-releasing agents can be used in preparing the solutions.

As an illustration of wood impregnation the 18 per cent solids solution (above described) was used to impregnate a yellow pine block. At room temperature and atmospheric pressure and no preliminary treatment, the block, after 5 minutes' immersion and then drying at 100°–105° C. to remove solvent and hydrolyze the silicate, was found to have taken up from 5 to 6 per cent of its weight of the composition. Greater absorption can be accomplished as by means of a more concentrated solution, longer time period, impregnating under pressure, etc. The composition gave improved flame-resistance to the wood.

What is claimed is:

1. An article of manufacture comprising a porous base impregnated with a composition comprising (1) a hydrolyzable ester selected from the group consisting of esters of aliphatic alcohols having up through five carbon atoms in the radical with acids of silicon, titanium and zirconium and their condensed esters, and (2) an agent of the group consisting of crystalline acids and salts thereof which agent upon heating decomposes to release water for reaction with the ester, and (3) a film-forming organic binder serving as a protective coating and water barrier for the impregnant.

2. Article according to claim 1 in which the ester is the silicate of a monohydric alcohol having up through five carbon atoms in the radical.

3. Article according to claim 1 in which the water-releasing agent is oxalic acid.

4. Article according to claim 1 in which the film-forming binder is a copolymer of vinyl acetate and vinyl chloride.

5. An article of manufacture comprising a porous base impregnated with a composition comprising (1) the silicate of a monohydric alcohol having up through five carbon atoms in the radical and (2) oxalic acid, and (3) a film-forming binder serving as a protective coating and water barrier for the impregnant.

6. Electrical conductor having porous insulation thereabout, a saturant for the insulation of (1) a hydrolyzable ester selected from the group consisting of esters of aliphatic alcohols having up through five carbon atoms in the radical with acids of silicon, titanium and zirconium and their condensed esters, and (2) an agent of the group consisting of crystalline acids and salts thereof which agent upon heating decomposes to release water for reaction with the ester, and (3) a film-forming organic binder serving as a protective coating and water barrier for the impregnant.

7. Electrical conductor according to claim 6 in which the ester is the silicate of a monohydric alcohol having up through five carbon atoms in the radical.

8. Electrical conductor according to claim 6 in which the water-releasing agent is oxalic acid.

9. Electrical conductor according to claim 6 in which the film-forming binder is a copolymer of vinyl acetate and vinyl chloride.

10. Electrical conductor having porous insulation thereabout, a saturant for the insulation of (1) a silicate of a monohydric alcohol having up through five carbon atoms in the radical, (2) oxalic acid, and (3) a film-forming organic binder serving as a protective coating and water barrier for the saturant.

11. Impregnating composition comprising in anhydrous organic solvent solution a hydrolyzable ester selected from the group consisting of esters of aliphatic alcohols having up through five carbon atoms in the radical with acids of silicon, titanium and zirconium and their condensed esters, an agent of the group consisting of crystalline acids and salts thereof which agent upon heating decomposes to release water for reaction with the ester, and a film-forming water-resistant organic binder soluble in the solvent.

12. Impregnating composition according to claim 11 in which the organic solvent is one that volatilizes at a temperature below the decomposition point of the water-releasing agent.

13. Impregnating composition according to claim 11 in which the ester is the silicate of a monohydric alcohol having up through five carbon atoms in the radical.

14. Impregnating composition according to claim 11 in which the water-releasing agent is oxalic acid.

15. Impregnating composition according to claim 11 in which the film-forming binder is a copolymer of vinyl acetate and vinyl chloride.

16. Impregnating composition comprising an acetone solution of an ethyl silicate, oxalic acid and a vinyl copolymer.

17. Method of treating a porous base which comprises impregnating the base with an anhydrous organic solvent solution of a composition of (1) a hydrolyzable ester selected from the group consisting of esters of aliphatic alcohols having up through five carbon atoms in the radical with acids of silicon, titanium and zirconium and their condensed esters, (2) an agent of the group consisting of crystalline acids and salts thereof which agent upon heating decomposes to release water for reaction with the ester and (3) a film-forming water-resistant organic binder soluble in the solvent, said composition serving upon heating to release water for reaction with the ester and deposit the oxide corresponding to the acid.

18. Method of treating porous insulation about an electrical conductor which comprises impregnating the insulation with an anhydrous organic solution of a composition of (1) a hydrolyzable ester selected from the group consisting of esters of aliphatic alcohols having up through five carbon atoms in the radical with acids of silicon, titanium and zirconium and their condensed esters, (2) an agent of the group consisting of crystalline acids and salts thereof which agent upon heating decomposes to release water for reaction with the ester and (3) a film-forming water-resistant organic binder soluble in the solvent, said composition serving upon heating to release water for reaction with the ester and deposit the oxide corresponding to the acid.

19. Method of treating porous insulation about an electrical conductor which comprises impregnating the insulation with an acetone solution of silicate of an aliphatic alcohol having up through five carbon atoms in the radical, oxalic acid and an acetone-soluble film-forming water-resistant binder, said composition serving upon heating to decompose the oxalic acid and release water for reacting with the silicate and depositing silica.

20. An article of manufacture comprising a porous base impregnated with a composition comprising (1) tetra-o-ethyl silicate, (2) oxalic acid in combining proportion to yield sufficient water upon heating to its decomposition temperature for hydrolysis of the tetra-o-ethyl silicate and (3) a temporary binder of a copolymer of vinyl acetate and vinyl chloride.

ROBERT E. BERRINGER.

REFERENCES CITED

The following references are of record in the file of this patent:

UNITED STATES PATENTS

| Number | Name | Date |
| --- | --- | --- |
| 1,561,988 | Laurie | Nov. 17, 1925 |
| 1,809,755 | King | June 9, 1931 |
| 2,027,931 | Ray | Jan. 14, 1936 |
| 2,027,932 | Ray | Jan. 14, 1936 |
| 2,201,840 | Vanable | May 21, 1940 |
| 2,215,048 | McGregor et al. | Sept. 17, 1940 |
| 2,258,218 | Rochow | Oct. 7, 1941 |
| 2,317,891 | Dennison | Apr. 27, 1943 |
| 2,329,632 | Marsden | Sept. 14, 1943 |
| 2,347,733 | Christenson | May 2, 1944 |